(12) United States Patent
Lai

(10) Patent No.: US 7,327,808 B2
(45) Date of Patent: Feb. 5, 2008

(54) PIPELINED ADAPTIVE DECISION FEEDBACK EQUALIZER

(75) Inventor: Jyh-Ting Lai, Hsinchu (TW)

(73) Assignee: Faraday Technology Corp., Hsin-Chu (TW)

( * ) Notice: Subject to any disclaimer, the term of this patent is extended or adjusted under 35 U.S.C. 154(b) by 771 days.

(21) Appl. No.: 10/802,317

(22) Filed: Mar. 17, 2004

(65) Prior Publication Data

US 2005/0207485 A1 Sep. 22, 2005

(51) Int. Cl.
*H03D 3/22* (2006.01)
(52) U.S. Cl. ..................... 375/329; 375/332
(58) Field of Classification Search ......... 375/229–236
See application file for complete search history.

(56) References Cited

U.S. PATENT DOCUMENTS

| | | | | |
|---|---|---|---|---|
| 5,031,195 A * | 7/1991 | Chevillat et al. | ............ | 375/234 |
| 5,119,401 A * | 6/1992 | Tsujimoto | .................... | 375/233 |
| 5,414,733 A * | 5/1995 | Turner | ......................... | 375/233 |
| 5,546,430 A * | 8/1996 | Liao et al. | .................. | 375/341 |
| 5,572,262 A * | 11/1996 | Ghosh | ......................... | 348/607 |
| 6,201,832 B1 * | 3/2001 | Choi | ............................ | 375/233 |
| 6,327,302 B1 * | 12/2001 | Shen | .......................... | 375/232 |
| 6,775,322 B1 * | 8/2004 | Zangi et al. | ................ | 375/232 |
| 2003/0161258 A1 * | 8/2003 | Zhang et al. | ............... | 370/203 |

OTHER PUBLICATIONS

"Pipelined Adaptive DFE Architectures Using Relaxed Look-Ahead" Shanbhag et al., Jun. 1995.

* cited by examiner

*Primary Examiner*—Chieh M. Fan
*Assistant Examiner*—Jason M. Perilla
(74) *Attorney, Agent, or Firm*—Winston Hsu

(57) ABSTRACT

A pipelined adaptive decision feedback equalizer (DFE). The pipelined ADFE comprises a pre-processing unit, an adder, a feedback filter (FBF), a slicer, a delay unit, a weight-update block and a mapping circuit. The pre-processing unit comprising a plurality of PP coefficients filters a signal received from a channel, and outputs a PP output signal to the adder. The slicer outputs a decision signal based on an added signal output from the adder. The FBF comprising a plurality of FBF coefficients receives the decision signal and generates a FBF output signal to the delay unit. The delay unit outputs a delayed signal to the adder. The weight-update block adapts the FBF coefficients to cancel the post-cursor ISI and selects a plurality of coefficients from the FBF coefficients. The mapping circuit translates the FFF coefficients by a predetermined method to generate the PP coefficients output to the pre-processing unit.

10 Claims, 3 Drawing Sheets

PIPELINED ADAPTIVE DECISION FEEDBACK EQUALIZER

BACKGROUND OF THE INVENTION

1. Field of the Invention

The invention relates to a decision feedback equalizer (DFE), and more particularly to a pipelined adaptive decision feedback equalizer (ADFE) that is able to relax the iteration bound in the decision feedback loop (DFL) and maintain signal to noise ration (SNR) equal to that of traditional DFE.

2. Description of the Related Art

Adaptive decision feedback equalizer (ADFE) using the least mean-squared (LMS) algorithm is a well-known equalization technique for magnetic storage and digital communication. The basic block diagram of traditional ADFE is depicted in FIG. 1, where ADFE is composed of two main finite impulse response (FIR) filters, the feedforward filter (FFF) 102 and the feedback filter (FBF) 104. A signal x(n) received from a channel is input to the ADFE. The outputs from both filters are added by an adder 112 and fed into a slicer 106. The signal output from the slicer 106 is the final equalized data. The basic function of the FFF 102 and the FBF 104 is to cancel the pre-cursor and post-cursor inter-symbol interference (ISI) respectively, while the WUC 108 and WUB 110 in the figure stand for the weight-update blocks for the FFF 102 and the FBF 104. Delay units D represent one-tap delay blocks. Delay units $D_1$ and delay units $D_2$ respectively represent $n_1$-tap delay blocks and $n_2$-tap delay blocks. In addition, $n_1$ and $n_2$ are positive integers. A vector of error values e(n) computed as the difference between the output of the slicer 106 and the output of the adder 112 outputs from an adder 114. The vector of error values e(n) is respectively delayed by the delay units $D_1$ and the delay units $D_2$, and then respectively fed back to the WUC 108 and WUB 110 to adapt the tap weights.

Basically, the fine-grain pipelining of the ADFE is known to be a difficult problem for high-speed applications. This is due to the decision feedback loop (DFL). According to the Iteration Bound theory, the smallest clock period of ADFE is bounded by the DFL. Thus, the presence of the above adaptation loop makes it even more difficult to achieve pipelining.

Several approaches are proposed to solve the aforementioned problems. For example, pipelining the ADFE can be achieved by pre-computing all possible in DFL to open the DFL. (See K. K. Parhi, "Pipelining in algorithm with quantizer loops," *IEEE Trans. Circ. Syst.*, vol. 38, pp. 745-754, July 1991). However, the parallel approach results in large hardware overhead as it transforms a serial algorithm into an equivalent (in the sense of input-output behavior) pipelined algorithm. Another algorithm is proposed in Naresh R. Shanbhag, and Keshab K. Parhi, "Pipelined adaptive DFE architectures using relaxed look-ahead," *IEEE Trans. Signal Processing*, vol. 43, No. 6, pp. 1368-1385, June 1995 (hereinafter Naresh et al), which is referred as PIPEADFE2. It maintains the functionality instead of input-output behavior using the technique of relaxed look-ahead.

FIG. 2 is a block diagram illustrating a configuration of the PIPEADFE2 as disclosed in Naresh et al. The PIPEADFE2 is composed of two main FIR filters, the feedforward filter (FFF) 202 and the feedback filter (FBF) 204. A signal x(n) received from a channel is input to the PIPEADFE2 and n is a time instance. The signal x(n) is delayed by a delay unit D, and then input to a pre-processing unit (PP) 220. The PP 220 receives coefficients from the WUB 210. The output of the PP 220 and the signal x(n) are added by an adder 216 and fed into the FFF 202.

In addition, the outputs from the FFF 202 and the FBF 204 are delayed by delay units $D_1$, and then added by an adder 212 and fed into a slicer 206. The signal output from the slicer 206 is the final equalized data. The basic function of the FFF 202 and the FBF 204 is to cancel the pre-cursor and post-cursor ISI respectively, while the WUC 208 and WUB 210 in the figure stand for the weight-update blocks for the FFF 202 and the FBF 204. C(n) is the vector of FFF coefficients and D(n) is the vector of FBF coefficients.

Moreover, delay units D represent one-tap delay blocks. The delay units $D_1$ and delay units $D_2$ respectively represent $n_1$-tap delay blocks and $n_2$-tap delay blocks, where $n_1$ and $n_2$ are positive integers. An error vector e(n) output from an adder 214 defines a vector of error values computed as the difference between the output of the slicer 206 and the output of the adder 212. Then, the error vector e(n) is respectively fed back to the WUC 208 and WUB 210 to adapt the tap weights.

The algorithm used in the PIPEADFE2 is explained as follows.

The channel is assumed as $(1+az^{-1})$ where the post-curser term is a (a<1), and there is no pre-cursor term. For the traditional ADFE shown in FIG. 1, after the ADFE is converged, the first FBF weight is (-a). The coefficients of the FFF 202 are the inverse transfer function of pre-cursors, but those of the FBF 204 are exactly negative value of post-cursors. However, the datum, to be multiplied by the first weight (-a), is in the DFL, and the circuit will limit the speed.

In PIPEADFE2, the input signal x(n) is filtered by the PP 220, where the transfer function is $1-az^{-1}$ (put the coefficient into the PP 220, which can be found in FIG. 6 or Eq. (24b) in Naresh et al). After combining the transfer function of the channel and the PP 220, the effective transfer function combining PP and the channel is $(1+az^{-1})(1-az^{-1})=1-a^2z^{-2}$, where the term $z^{-1}$ disappears. It means the transfer function of FBF 204 is modified from $(-a+0z^{-1})$ to $(0+a^2z^{-1})$. Thus, the first coefficient can be zero to relax the critical path by a tap of delay. After the cut-set transform, the delay can be moved to the output of FBF 204. Therefore, the algorithm of PP-ADFE can be derived.

Secondly, the channel is considered as $(1+az^{-1}+bz^{-2})$ and the PP 220 is increased to 2 taps. The effective transfer function of the PP 220 and the channel is $(1+az^{-1}+bz^{-2})(1-az^{-1}-bz^{-2})=1+0z^{-1}-a^2z^{-2}-2abz^{-3}-b^2z^{-4}$. For low pass channel, i.e., 1>a>b, the term $(+2abz^{-3}-b^2z^{-4})$ is very small and the performance is almost the same as traditional ADFE. However, on the other hand, for a specific band pass filter, 1>b>a, the duration of FBF 204 should be extended and the term $(-2abz^{-3}-b^2z^{-4})$ is large enough to degrade the convergence speed.

Therefore, even though the DFL problem can be addressed by PIPEADFE2, the output SNR of PIPEADFE2 is channel dependent and will be degraded in non-lowpass type channels.

SUMMARY OF THE INVENTION

An object of the present invention is to provide a pipelined adaptive decision feedback equalizer (ADFE). Except for increasing the operation speed of the ADFE, the ADFE is capable of relaxing the iteration bound in the decision feedback loop (DFL) and simultaneously maintain signal to noise ration (SNR) equal to that of traditional DFE.

The present invention provides a pipelined adaptive decision feedback equalizer (DFE). A signal received from a channel is equalized by the pipelined ADFE. The pipelined ADFE comprises the pre-processing unit, a feedforward filter (FFF), an adder, a slicer, a feedback filter (FBF), a delay unit, a feedforward filter weight-update block (WUC), a feedback filter weight-update block (WUB) and a mapping circuit. The pre-processing unit (PP) comprising a plurality of PP coefficients filters the signal received from the channel, and generates a PP output signal to the FFF. The coefficients in PP are calculated by the mapping circuit. On the other hand, the inputs of the MAP circuit are the coefficients of FBF.

The FFF comprising a plurality of adaptive coefficients cancels pre-cursor intersymbol interference (ISI) and outputs a precursor free signal to the adder, which adds both output signals from FBF and FFF respectively. The WUB adapts the filter coefficients to cancel the pre-cursor ISI. The slicer outputs a final decision signal based on the output of the adder. The FBF comprises a plurality of FBF coefficients. The FBF receives the final decision signal from the slicer and generates a FBF output signal. The delay unit receives the FBF output signal and outputs a delayed FBF output signal to the adder. The WUC adapts the coefficients which feed into FBF to cancel the post-cursor ISI. The mapping circuit translates the FBF coefficients by a predetermined method to generate the PP coefficients. At least one element of the set of the PP coefficients is different from the corresponding element of the set of the FBF coefficients.

DESCRIPTION OF THE DRAWINGS

The present invention is herein described by way of exemplary embodiments, but not limitations, illustrated in the accompanying drawings in which like references denote similar elements, and in which.

DETAILED DESCRIPTION OF THE INVENTION

Figure 3:
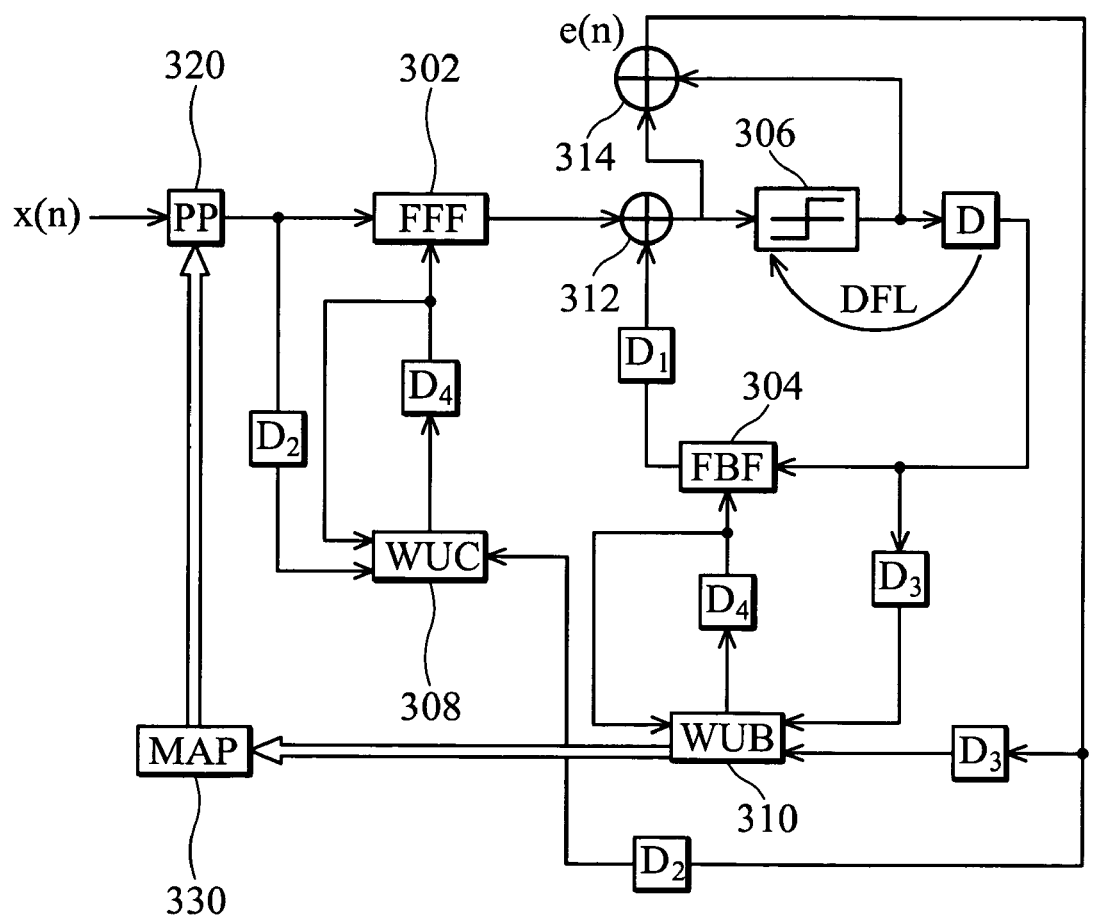
FIG. 3 is a block diagram illustrating a configuration of a pipelined ADFE according to the embodiment of the present invention.

FIG. 3 is a block diagram illustrating a configuration of a pipelined ADFE according to the embodiment of the present invention.

The pipelined ADFE is composed of two main FIR filters, the feedforward filter (FFF) 302 and the feedback filter (FBF) 304. A signal x(n) received from a channel is input to the pipelined ADFE and n is a time instance. After being delayed by a delay unit D, the signal x(n) is input to a pre-processing unit (PP) 320. The PP 320 comprises at least one coefficient (not shown in FIG. 3) generated from a map circuit 320 and a delay unit (not shown in FIG. 3). The delay unit in the PP 320 is an m-tap delay block and m is a positive integer. The PP 320 receives updated coefficients from a mapping circuit (MAP) 330. The output of the PP 320 is fed into the FFF 302.

In addition, the output from the FBF 303 is delayed by a delay unit $D_1$ and then input to an adder 312. The outputs from the FBF 304 and the delay unit $D_1$ are added by the adder 312. The signal output from the adder 312 is the equalized data, and is fed into a slicer 306. The signal output from the slicer 306 is the final decision data. The basic function of the FFF 302 and the FBF 304 is to cancel the pre-cursor and post-cursor ICI respectively, while the WUC 308 and WUB 310 in the figure stand for the weight-update blocks for the FFF 302 and the FBF 304. C(n) is the vector of FFF coefficients and D(n) is the vector of FBF coefficients.

In this embodiment of the invention, the WUC 308 and WUB 310 use Delay Least-Mean-Square (DLMS) to adapt the tap weights. Delay units D represent one-tap delay blocks. The delay units $D_1$, $D_2$, $D_3$, and $D_4$ respectively represent $n_1$-tap delay blocks, $n_2$-tap delay blocks, $n_3$-tap delay blocks and $n_4$-tap delay blocks, where $n_1$, $n_2$, $n_3$, and $n_4$ are positive integers. An error vector e(n) output from an adder 314 defines a vector of error values computed as the difference between the output of the slicer 306 and the output of the adder 312. Then, the error vector e(n) is respectively fed back to the WUC 308 and WUB 310 to adapt the tap weights.

The WUB 310 also selects at least one mapping coefficient from the set of the coefficients of the WUB and input the mapping coefficient to the MAP 330. The MAP 330 translates the mapping coefficient by a predetermined method to generate the updated coefficients of the PP 320. At least one element of the set of the mapping coefficient is different from the corresponding element of the set of the filter coefficients of the PP 320.

Figure 1:
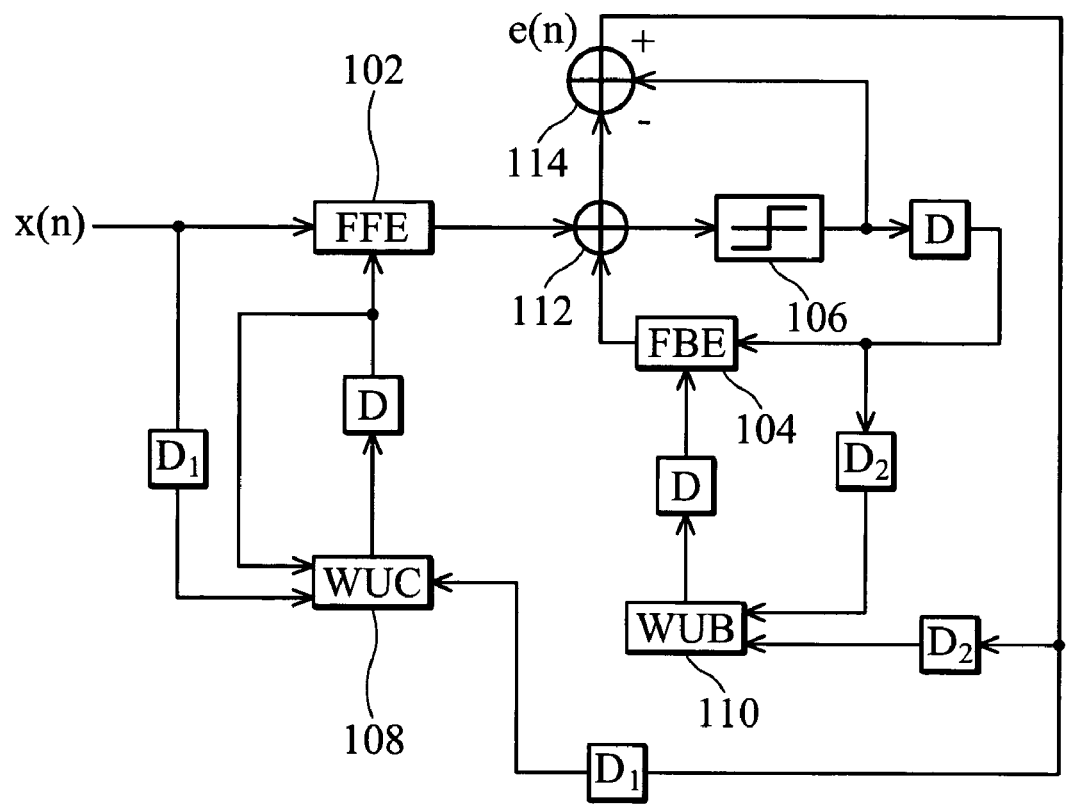
FIG. 1 is a block diagram illustrating a configuration of a traditional DFE.
Figure 2:
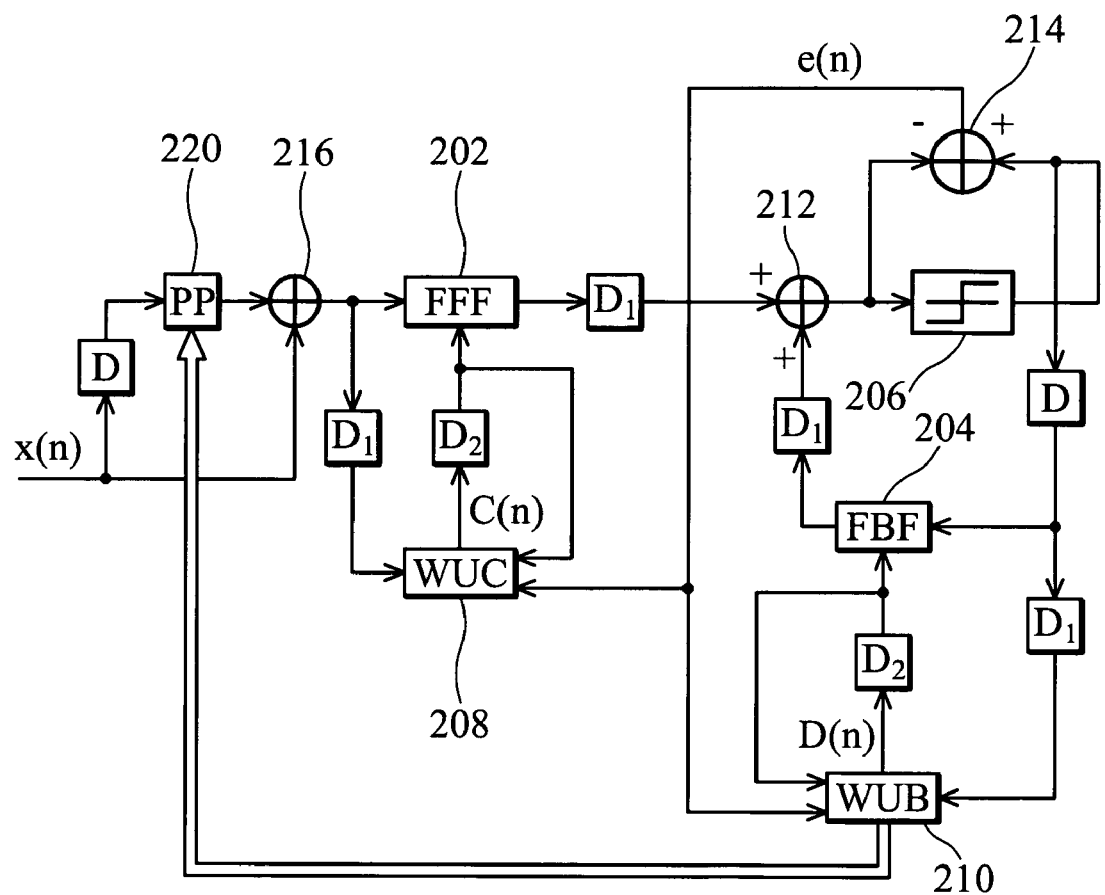
FIG. 2 is a block diagram illustrating a configuration of a pipelined ADFE as disclosed in Naresh et al.

The PP 320 is coupled before the FFF 302. However, the coefficients of the PP 320 are not directly connected from the coefficients of the WUB 210 as shown in FIG. 2. The coefficients of the PP 320 are updated by coefficients output from the MAP 330. After inserting the MAP function, the first m taps of the WUB 310 will decrease. As shown in FIG. 3, the first m taps are moved from the input terminal to the output terminal of the FBF 304 and these weights can be removed to relax DFL.

One example of the MAP function is explained as follows.

The coefficient of the WUB 310 which will be fed into the MAP 330 is assumed as $a_i$. The coefficient of the PP 320 which is copied from the output of the MAP 330 is assumed as $b_i$. The relationship between $a_i$ and $b_i$ is, $$\left(1 - \sum_{i=1}^{M} a_i x^i\right)\left(1 + \sum_{j=1}^{N} b_j x^j\right) = 1 + \sum_{k=1}^{M+N} c_k x^k, \ \exists \, c_k = 0 \quad (1)$$

if $0 < k < n_1$, where M is the number of the coefficients of the WUB 310, N is the number of the coefficients of the PP 320, and M, N, i, j and k are positive integer. Thus, for a given m, we can find a MAP function to translate the coefficients of the PP from the WUB. It should be noted that, (m+1) is the speedup factor of the pipelined ADFE. Even though the MAP 330 is the feedback circuit of the pipelined ADFE, the MAP 330 is not a time critical part relative to the slowly converged WUB. Therefore, the MAP 330 can be easily pipelined to relax the path delay.

In addition, when M=1 and N=1, the output of the MAP 330 is the same as the output of the WUB 210 shown in FIG. 2.

The principle of the MAP 330 is explained as follows.

The Z-transform of the post-cursor channel is assumed as $$H(z) = \left(1 + \sum_{i=1}^{M} A_i z^{-i}\right).$$

After the FBF 304 converged, the final coefficients of the FBF 304 are exactly the negative value of channel coefficients. That is, $$\alpha_i = -A_i. \quad (2)$$

From Eqs. (1) and (2), the effective channel response joint with the PP 320 and real channel is, $$H(z)PP(z) = \left(1 + \sum_{i=1}^{M} A_i z^{-i}\right)\left(1 + \sum_{j=1}^{N} b_j z^{-j}\right)$$
$$= 1 + \sum_{k=1}^{M+N} c_k x^{-k}, \exists c_k = 0, 0 < k < n_1$$

where $c_k$ will be the coefficients of the FBF 304. Because $c_k$ are all zeros in the first m taps of the FBF 304, after using the above technique of relaxed look-ahead, the delays can be moved to the output of the FBF 304, which is shown in FIG. 3 as delay unit $D_1$.

And thus, the present pipelined ADFE is able to relax the iteration bound in DFL and keep the SNR as high as traditional DFE.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A pipelined adaptive decision feedback equalizer for equalizing a signal received from a channel, comprising:
    a pre-processing unit (PP) comprising a plurality of PP coefficients for filtering the signal, and generating a PP output signal;
    a feedforward filter (FFF) comprising a plurality of FFF coefficients, coupled to the pre-processing unit to receive the PP output signal;
    an adder coupled to the feedforward filter and outputting an added signal;
    a slicer coupled to the output terminal of the adder, the slicer outputting a decision signal based on the added signal;
    a feedback filter (FBF) comprising a plurality of FBF coefficients, coupled to the slicer for receiving the decision signal, the feedback filter canceling post-cursor ISI and generating a FBF output signal;
    a delay unit coupled between the feedback filter and the second input terminal of the adder, the delay unit receiving the FBF output signal and generating a delayed FBF output signal to the adder, wherein the delay unit is a n1-tap delay block, n1 is positive integer and $n1 \geq 2$;
    a first weight-update block for adapting the FBF coefficients to cancel the post-cursor ISI and selecting a plurality of mapping coefficients from the FBF coefficients; and
    a mapping circuit for translating the plurality of mapping coefficients by a predetermined method to generate the PP coefficients and outputting the PP coefficients to the pre-processing unit, wherein at least one element of the plurality of mapping coefficients is different from a corresponding element of the coefficients.

2. The pipelined adaptive decision feedback equalizer of claim 1, wherein the first weight-update block adapts the FBF coefficients according to a Delay Least-Mean-Square algorithm.

3. The pipelined adaptive decision feedback equalizer of claim 1 further comprises:
    a second weight-update block for adapting the FFF coefficients to cancel the pre-cursor ISI.

4. The pipelined adaptive decision feedback equalizer of claim 3, wherein the second weight-update block adapts the FFF coefficients according to a Delay Least-Mean-Square algorithm.

5. The pipelined adaptive decision feedback equalizer of claim 1, wherein, in the mapping circuit, a relation between the mapping coefficient ai and the PP coefficient bj is $$\left(1 - \sum_{i=1}^{M} a_i x^i\right)\left(1 + \sum_{j=1}^{N} b_j x^j\right) = 1 + \sum_{k=1}^{M+N} c_k x^k, \exists c_k = 0$$

if $0 < k < n_1$;

wherein M is a number of the mapping coefficient, N is a number of the PP coefficient and M, N, i, j and k are positive integers.

6. A decision feedback equalizer for equalizing a signal received from a channel, comprising:
    a pre-processing unit (PP) comprising n1 PP coefficients and a first delay unit, the pre-processing unit filtering the signal, and generating a PP output signal, wherein the first delay unit is a n1-tap delay block, n1 is positive integer and $n1 \geq 2$;
    a feedforward filter (FFF) comprising a plurality of FFF coefficients, coupled to the pre-processing unit to receive the PP output signal, the feedforward filter canceling pre-cursor intersymbol interference (ISI) and outputting a FFF output signal;
    an adder having a first input terminal, a second input terminal and an output terminal, the first input terminal coupled to the feedforward filter, the output terminal outputting an added signal;
    a slicer coupled to the output terminal of the adder, the slicer outputting a decision signal based on the added signal;
    a feedback filter (FBF) comprising n2 FBF coefficients and a third delay unit, coupled to the slicer, the feedback filter canceling post-cursor ISI and outputting a FBF output signal, wherein the third delay unit is a n3-tap delay block, n2 and n3 are positive integers and n2=n3+n1;
    a delay unit coupled between the feedback filter and the second input terminal of the adder, the delay unit receiving the FBF output signal and generating a delayed FBF output signal to the second input terminal of the adder, wherein the delay unit is a n1-tap delay block;
    a first weight-update block for adapting the FBF coefficients to cancel the post-cursor ISI and selecting n4 mapping coefficients from the FBF coefficients, wherein n4 is the natural number and $n4 \geq n1$; and
    a mapping circuit for translating the mapping coefficients by a predetermined method to generate the PP coefficients and outputting the PP coefficients to the pre-processing unit, wherein at least one element of the mapping coefficients is different from a corresponding element of the PP coefficients.

7. The pipelined adaptive decision feedback equalizer of claim 6, wherein the first weight-update block adapts the FBF coefficients according to a Delay Least-Mean-Square algorithm.

8. The pipelined adaptive decision feedback equalizer of claim 6 further comprises:
   a second weight-update block for adapting the FFF coefficients to cancel the pre-cursor ISI.

9. The pipelined adaptive decision feedback equalizer of claim 8, wherein the second weight-update block adapts the FFF coefficients according to a Delay Least-Mean-Square algorithm.

10. The pipelined adaptive decision feedback equalizer of claim 6, wherein, in the mapping circuit, a relation between the mapping coefficient ai and the PP coefficient bj is $$\left(1 - \sum_{i=1}^{M} a_i x^i\right)\left(1 + \sum_{j=1}^{N} b_j x^j\right) = 1 + \sum_{k=1}^{M+N} c_k x^k, \exists\, c_k = 0$$

if $0 < k < n_1$;

wherein M is a number of the mapping coefficient, N is a number of the PP coefficient and M, N, i, j and k are positive integers.

* * * * *